United States Patent
Iwrey et al.

(10) Patent No.: US 11,168,619 B2
(45) Date of Patent: Nov. 9, 2021

(54) SYSTEMS AND METHODS FOR CONTROLLING SURGE MARGIN IN THE COMPRESSOR SECTION OF A GAS TURBINE ENGINE

(71) Applicant: ROLLS-ROYCE NORTH AMERICAN TECHNOLOGIES INC., Indianapolis, IN (US)

(72) Inventors: Benjamin Michael Iwrey, Indianapolis, IN (US); Graham Adam Burkholder, Avon, IN (US)

(73) Assignee: Rolls-Royce North American Technologies Inc., Indianapolis, IN (US)

( * ) Notice: Subject to any disclaimer, the term of this patent is extended or adjusted under 35 U.S.C. 154(b) by 154 days.

(21) Appl. No.: 16/390,774

(22) Filed: Apr. 22, 2019

(65) Prior Publication Data

US 2020/0332724 A1  Oct. 22, 2020

(51) Int. Cl.
| | |
|---|---|
| F02C 9/18 | (2006.01) |
| F01D 19/00 | (2006.01) |
| F02C 3/10 | (2006.01) |
| F02C 7/32 | (2006.01) |
| F02C 6/08 | (2006.01) |

(52) U.S. Cl.
CPC ............ *F02C 9/18* (2013.01); *F01D 19/00* (2013.01); *F02C 3/10* (2013.01); *F02C 6/08* (2013.01); *F02C 7/32* (2013.01)

(58) Field of Classification Search
CPC ...... F02C 6/08; F02C 3/10; F02C 9/18; F02C 9/52; F05D 2220/62
See application file for complete search history.

(56) References Cited

U.S. PATENT DOCUMENTS

| | | | |
|---|---|---|---|
| 4,163,365 A * | 8/1979 | Frutschi | F02C 9/16 60/39.183 |
| 5,137,230 A | 8/1992 | Coffinberry | |
| 8,063,501 B2 | 11/2011 | Finney | |
| 9,074,606 B1 * | 7/2015 | Moore | F04D 19/02 |
| 9,650,967 B2 | 5/2017 | DeFrancesco | |
| 9,656,756 B2 | 5/2017 | Atkey | |
| 9,765,700 B2 | 9/2017 | Mackin et al. | |
| 9,810,158 B2 | 11/2017 | Foutch et al. | |
| 10,041,407 B2 | 8/2018 | Nenmeni et al. | |
| 10,054,051 B2 | 8/2018 | Foutch et al. | |
| 10,100,744 B2 | 10/2018 | Mackin et al. | |
| 2014/0026588 A1 * | 1/2014 | Velez | F02C 3/13 60/782 |
| 2015/0251766 A1 | 9/2015 | Atkey | |
| 2016/0273399 A1 * | 9/2016 | Ekanayake | F02C 6/08 |

(Continued)

OTHER PUBLICATIONS

The Jet Engine, Rolls-Royce plc, Fifth Edition, ISBN 0902121 235, 1996, p. 25. (Year: 1996).*

*Primary Examiner* — Scott J Walthour
*Assistant Examiner* — David P. Olynick
(74) *Attorney, Agent, or Firm* — Barnes & Thornburg LLP

(57) ABSTRACT

Systems and methods are disclosed for controlling surge margin in the compressor section of a gas turbine engine. Bypass ports on a first compressor section and second compressor section lead to a bypass conduit. An auxiliary turbine and discharge conduit are positioned in the bypass conduit. Fluid flow from the compressor sections into the bypass conduit via the bypass ports is controlled by bypass control valves.

14 Claims, 8 Drawing Sheets

(56) References Cited

U.S. PATENT DOCUMENTS

| | | | |
|---|---|---|---|
| 2016/0273404 A1* | 9/2016 | Ekanayake | F01K 23/10 |
| 2017/0002739 A1* | 1/2017 | Ramirez | F02C 7/052 |
| 2017/0051679 A1 | 2/2017 | Becker, Jr. | |

* cited by examiner

SYSTEMS AND METHODS FOR CONTROLLING SURGE MARGIN IN THE COMPRESSOR SECTION OF A GAS TURBINE ENGINE

BACKGROUND

In modern gas turbine engines, bleeding air from a later stage of a compressor is a common technique for controlling the surge margin in the compressor. Since the compressor has already performed work on the air, this technique of bleeding air from a compressor trades efficiency for surge margin. While bleeding air may be essential to maintaining surge margin in a compressor, improvements are desired that would reduce and/or eliminate the efficiency penalty associated with bleeding air.

SUMMARY

According to some aspects of the present disclosure, a system is disclosed for controlling surge margin in a compressor section of a gas turbine engine. The system comprises a first compressor section, a second compressor section, a bypass conduit, first and second compressor section bypass ports and bypass control valves, an auxiliary turbine, and a discharge conduit with a discharge control valve. The first compressor section comprises one or more compressor stages defining a first compressor section flowpath and a first compressor section discharge in fluid communication with the first compressor section flowpath. The first compressor section bypass port is positioned along the first compressor section and in fluid communication with the first compressor flowpath. The second compressor section comprises one or more compressor stages defining a second compressor section flowpath and a second compressor section discharge in fluid communication with the second compressor section flowpath. The second compressor section flowpath is in fluid communication with the first compressor section flowpath. The second compressor section bypass port is positioned along the second compressor section and in fluid communication with the second compressor section flowpath. The bypass conduit extends between the first compressor section bypass port and the second compressor section bypass port. The first compressor section bypass control valve is positioned in the bypass conduit downstream of the first compressor section bypass port. The second compressor section bypass control valve is positioned in the bypass conduit downstream of the second compressor section bypass port. The auxiliary turbine is positioned in the bypass conduit between the first compressor section bypass control valve and the second compressor section bypass control valve. The discharge conduit is coupled to and in fluid communication with the bypass conduit between the auxiliary turbine and the second compressor section bypass control valve. The discharge control valve is positioned in the discharge conduit.

In some embodiments the auxiliary turbine drives a motor-generator. In some embodiments the auxiliary turbine is an impulse turbine. In some embodiments the system further comprises a controller, the controller in communication with the first compressor section bypass control valve, the second compressor section bypass control valve, and the discharge control valve. In some embodiments the controller is further in communication with the auxiliary turbine. In some embodiments the controller is configured to control a position of one or more of the first compressor section bypass control valve, the second compressor section bypass control valve, and the discharge control valve to maintain surge margin of one or both of the first compressor section and the second compressor section at or above a predetermined level.

According to further aspects of the present disclosure method is disclosed for controlling surge margin in a compressor section of a gas turbine engine. The method comprises operating a first compressor section to increase the pressure of a fluid flowing therethrough, the first compressor section comprising one or more first compressor stages defining a first compressor section flowpath, a first compressor section discharge in fluid communication with the first compressor section flowpath, and a first compressor section bypass port positioned along the first compressor section and in fluid communication with the first compressor section flowpath; discharging the fluid from the first compressor section and directing the fluid to a second compressor section, the second compressor section comprising one or more second compressor stages defining a second compressor section flowpath in fluid communication with the first compressor section discharge, a second compressor section discharge in fluid communication with the second compressor section flowpath, and a second compressor section bypass port positioned along the second compressor section and in fluid communication with the second compressor section flowpath; operating the second compressor section to increase the pressure of the fluid flowing therethrough; diverting a portion of the fluid flowing through the second compressor section via the second compressor section bypass port to a bypass conduit; directing the diverted portion of fluid through an auxiliary turbine positioned in the bypass conduit; and directing the diverted portion of fluid in the bypass conduit into the fluid flowing through the first compressor section via the first compressor section bypass port.

In some embodiments the method further comprises discharging a portion of the diverted portion of fluid via a discharge conduit. In some embodiments the step of diverting a portion of the fluid flowing through the second compressor section via the second compressor section bypass port comprises opening a second compressor section bypass control valve positioned in the bypass conduit. In some embodiments the step of diverting a portion of the fluid flowing through the second compressor section via the second compressor section bypass port further comprises throttling the second compressor section bypass control valve to control the flow rate of diverted fluid.

In some embodiments the step of directing the diverted portion of fluid in the bypass conduit into the fluid flowing through the first compressor section comprises opening a first compressor section bypass control valve positioned in the bypass conduit. In some embodiments the step of directing the diverted portion of fluid in the bypass conduit into the fluid flowing through the first compressor section further comprises throttling the first compressor section bypass control valve to control the flow rate of directed fluid. In some embodiments the rotational speed of the auxiliary turbine is at least partly controlled by throttling the second compressor section bypass control valve. In some embodiments the rotational speed of the auxiliary turbine is at least partly controlled by throttling the first compressor section bypass control valve. In some embodiments the step of discharging a portion of the diverted portion of fluid via a discharge conduit comprises opening a discharge control valve positioned in the discharge conduit. In some embodiments the rotational speed of the auxiliary turbine is at least partly controlled by throttling the discharge control valve.

According to still further aspects of the present disclosure, a method is disclosed for controlling surge margin in a compressor section of a gas turbine engine. The method comprises operating a first compressor section to increase the pressure of a fluid flowing therethrough, the first compressor section comprising one or more first compressor stages defining a first compressor section flowpath, a first compressor section discharge in fluid communication with the first compressor section flowpath, and a first compressor section bypass port positioned along the first compressor section and in fluid communication with the first compressor section flowpath; discharging the fluid from the first compressor section and directing the fluid to a second compressor section; diverting a portion of the fluid flowing through the first compressor section via the first compressor section bypass port to a bypass conduit; and directing the diverted portion of fluid through an auxiliary turbine positioned in the bypass conduit.

In some embodiments the method further comprises discharging the diverted portion of fluid after flowing through the auxiliary turbine via a discharge conduit. In some embodiments the step of diverting a portion of the fluid flowing through the first compressor section comprises opening a first compressor section bypass control valve positioned in the bypass conduit. In some embodiments the rotational speed of the auxiliary turbine is at least partly controlled by throttling the first compressor section bypass control valve.

BRIEF DESCRIPTION OF THE DRAWINGS

The following will be apparent from elements of the figures, which are provided for illustrative purposes.

Figure 1:
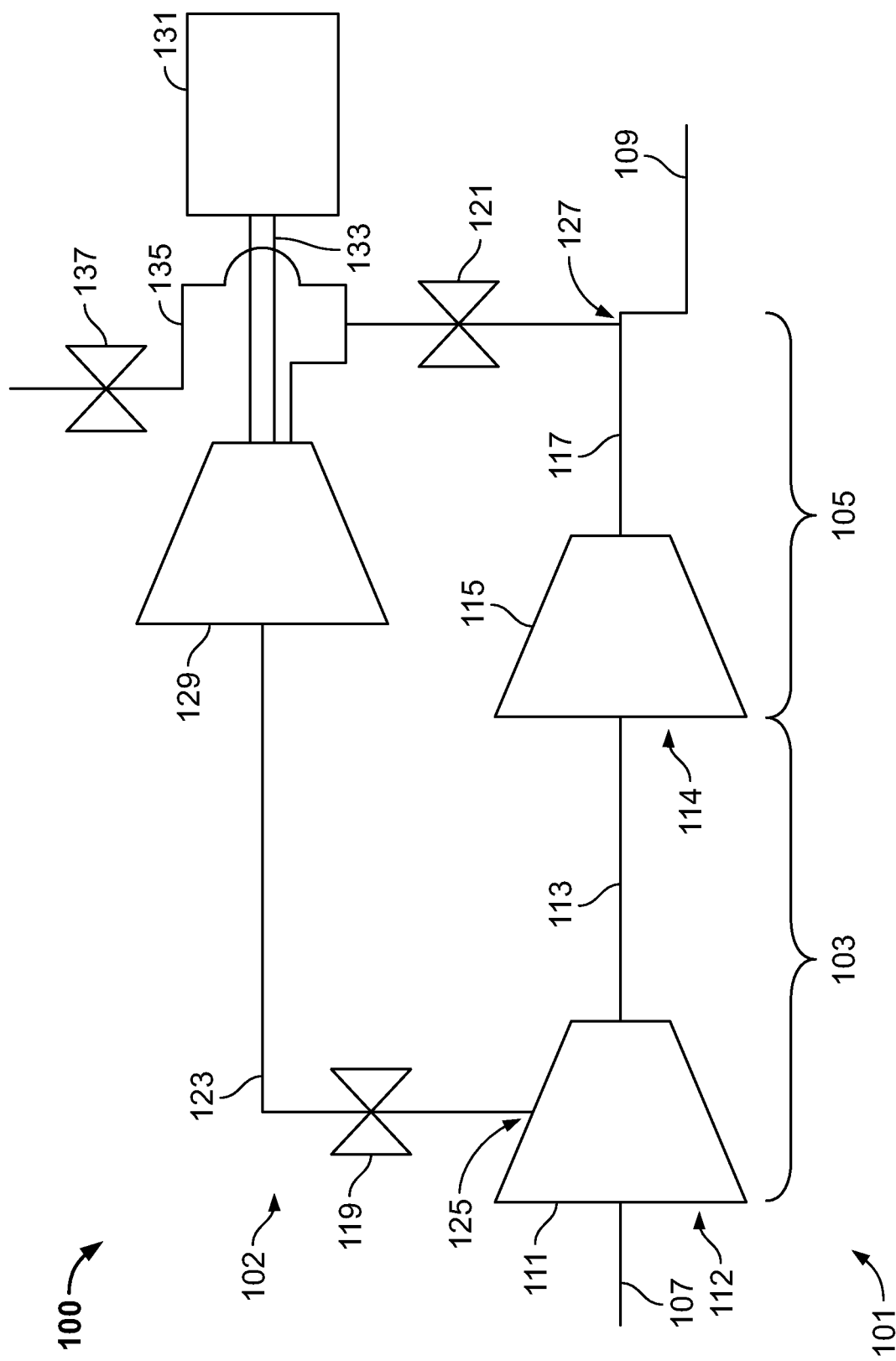
FIG. 1 is a schematic view of a system for controlling surge margin in a compressor section in accordance with some embodiments of the present disclosure.

The present application discloses illustrative (i.e., example) embodiments. The claimed inventions are not limited to the illustrative embodiments. Therefore, many implementations of the claims will be different than the illustrative embodiments. Various modifications can be made to the claimed inventions without departing from the spirit and scope of the disclosure. The claims are intended to cover implementations with such modifications.

DETAILED DESCRIPTION

For the purposes of promoting an understanding of the principles of the disclosure, reference will now be made to a number of illustrative embodiments in the drawings and specific language will be used to describe the same.

The present disclosure is directed to systems and methods for controlling and improving surge margin in the compressor section of a gas turbine engine while reducing efficiency losses associated with bleeding air from the compressor section. The present disclosure provides a system for using air bled from the compressor section to rotate an auxiliary turbine and therefore recover work performed by the system and improve system efficiency as compared to a system that merely bleeds air from the compressor section. The present disclosure additionally presents methods of operating a compressor section and bypass system to control and improve surge margins the compressor section.

Figure 2:
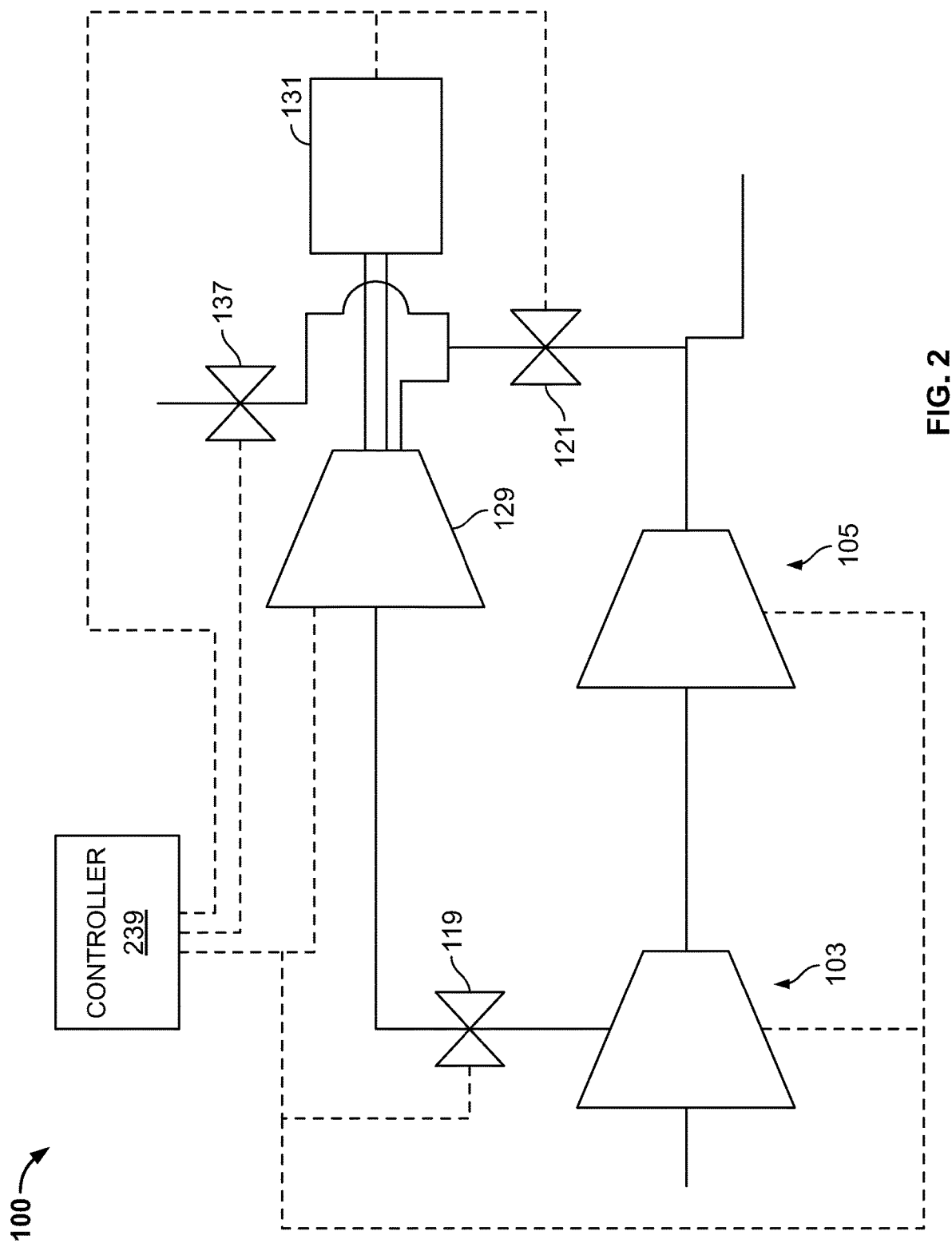
FIG. 2 is a schematic view of a system for controlling surge margin in a compressor section in accordance with some embodiments of the present disclosure.

A system 100 for controlling surge margin in the compressor section 101 of a gas turbine engine is schematically presented in FIGS. 1 and 2. The system 100 may comprise a compressor section 101 and a bypass section 102.

The compressor section 101 may comprise a compressor section inlet 107, a first compressor section 103, a second compressor section 105, and a compressor section outlet 109. The first compressor section 103 may comprise one or more first compressor stages 111 and a first compressor section discharge 113. The first compressor section stages 111 define a first compressor section flowpath 112. The first compressor section discharge 113 is in fluid communication with the first compressor section flowpath 112.

The second compressor section 105 may comprise one or more second compressor stages 115 and a second compressor section discharge 117. The second compressor section stages 115 define a second compressor section flowpath 114. The second compressor section discharge 117 is in fluid communication with the second compressor section flowpath 114. The second compressor section flowpath 114 is in fluid communication with the first compressor section flowpath 112.

During operation, the compressor section 101 accepts fluid through the compressor section inlet 107 and rotating bladed rotors of the first and second compressor section stages 111, 115 increase the pressure of the fluid before the fluid is discharged via the compressor section outlet 109. During operation, the second compressor section 105 typically receives fluid discharged from the first compressor section 103. Fluid discharged at the compressor section outlet 109 may be sent to a combustion chamber of the gas turbine engine, or may be used in additional applications requiring a pressurized fluid.

A bypass section 102 of system 100 may comprise a first compressor section bypass port 125, a second compressor section bypass port 127, a first compressor section bypass control valve 119, a second compressor section bypass control valve 121, and a bypass conduit 123. In some embodiments, the bypass section 102 further comprises an auxiliary turbine 129 positioned in the bypass conduit 123. In some embodiments, the bypass section 102 further comprises a discharge conduit 135 in fluid communication with at least a portion of the bypass conduit 123.

The first compressor section bypass port 125 may be positioned at any point along the first compressor section 103 and may further be in fluid communication with the first compressor section flowpath 112. The first compressor section bypass port 125 is used to divert fluid flow from the first compressor section flowpath 112. The first compressor bypass port 125 may be positioned at any stage of the first compressor section 103 or at the first compressor section discharge 113. Although schematically depicted as a single port 125, the first compressor section bypass port 125 may be multiple ports.

Flow through the first compressor section bypass port 125 may be controlled by a first compressor section bypass control valve 119. The first compressor section bypass control valve 119 may be positioned adjacent the first compressor section bypass port 125 or downstream of the port 125. The first compressor section bypass control valve 119 may be opened, shut, or throttled to control fluid flow through the first compressor section bypass port 125.

The second compressor section bypass port 127 may be positioned at any point along the second compressor section 105 and may further be in fluid communication with the second compressor section flowpath 114. The second compressor section bypass port 127 is used to divert fluid flow from the second compressor section flowpath 114. The second compressor bypass port 127 may be positioned at any stage of the second compressor section 105 or at the second compressor section discharge 117. Although schematically depicted as a single port 127, the second compressor section bypass port 127 may be multiple ports.

Flow through the second compressor section bypass port 127 may be controlled by a second compressor section bypass control valve 121. The second compressor section bypass control valve 121 may be positioned adjacent the second compressor section bypass port 127 or downstream of the port 127. The second compressor section bypass control valve 121 may be opened, shut, or throttled to control fluid flow through the second compressor section bypass port 127.

The bypass conduit 123 extends between the first compressor section bypass port 125 and the second compressor section bypass port 127. The bypass conduit 123 is generally in fluid communication with the downstream sides of the first compressor section bypass control valve 119 and the second compressor section bypass control valve 121. When the first compressor section bypass control valve 119 is open, the bypass conduit 123 may be in fluid communication with the first compressor section bypass port 125 and the first compressor section flowpath 112. When the second compressor section bypass control valve 121 is open, the bypass conduit 123 may be in fluid communication with the second compressor section bypass port 127 and the second compressor section flowpath 114.

An auxiliary turbine 129 may be positioned in and in fluid communication with the bypass conduit 123. The auxiliary turbine 129 may be positioned between the first compressor section bypass control valve 119 and the second compressor section bypass control valve 121. The auxiliary turbine 129 may drive a motor-generator 131 via a shaft 133. The auxiliary turbine 129 may be an impulse turbine. Shaft 133 may be parallel with a shaft and/or axis of rotation of the compressor section 101 and/or the gas turbine engine, or may have a divergent axis of rotation.

A discharge conduit 135 may extend from and be in fluid communication with the bypass conduit 123 at a position between the auxiliary turbine 129 and the second compressor section bypass control valve 121. The discharge conduit 135 may direct fluid flow to an atmospheric discharge or to another system. Fluid flow through the discharge conduit 135 is controlled by a discharge control valve 137 positioned in the discharge conduit 135.

In some embodiments, an additional discharge conduit and discharge control valve may be provided, extending from and in fluid communication with the bypass conduit 123 at a position between the auxiliary turbine 129 and the first compressor section bypass control valve 119.

A controller 239 may communicate with and/or control various components of the system 100. As shown by the dashed lines of FIG. 2, the controller 239 may communicate with and control one or more of the first compressor section 103, the second compressor section 105, the first compressor section bypass control valve 119, the second compressor section bypass control valve 121, the auxiliary turbine 129, the motor-generator 131, and the discharge control valve 137. By controlling the position of the first compressor section bypass control valve 119, the second compressor section bypass control valve 121, and the discharge control valve 137, the controller 239 may control fluid flow through the system 100. Further, the controller 239 may control the rotational speed of the auxiliary turbine 129 by controlling the position (i.e. open, shut, or throttled) of the control valves 119, 121, 137. The controller 239 may also control the rotational speed of the auxiliary turbine 129 by modulating the operating parameters of the motor-generator 131 and/or by modulating the instantaneous torque.

By controlling the fluid flow through the bypass section 102, the controller 239 may control the surge margin of one or more of the compressor section 101, the first compressor section 103, and the second compressor section 105. The controller 239 may be configured to control the surge margin to a predetermined level, for example to a predetermined level of 10% below the surge line of a compressor section 101.

Figure 3:
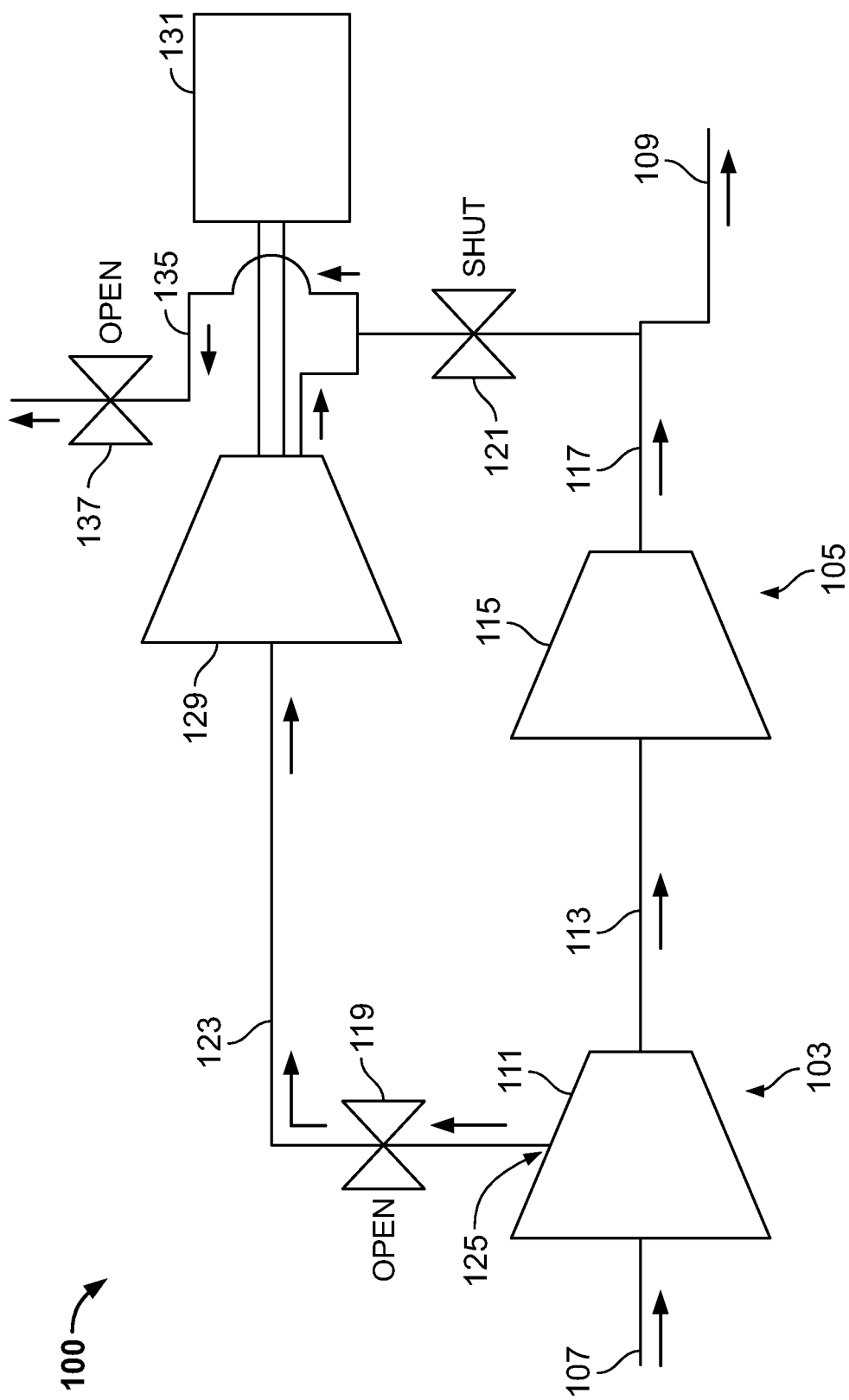
FIG. 3 is a schematic view of the operation a system for controlling surge margin in a compressor section in accordance with some embodiments of the present disclosure.
Figure 4:
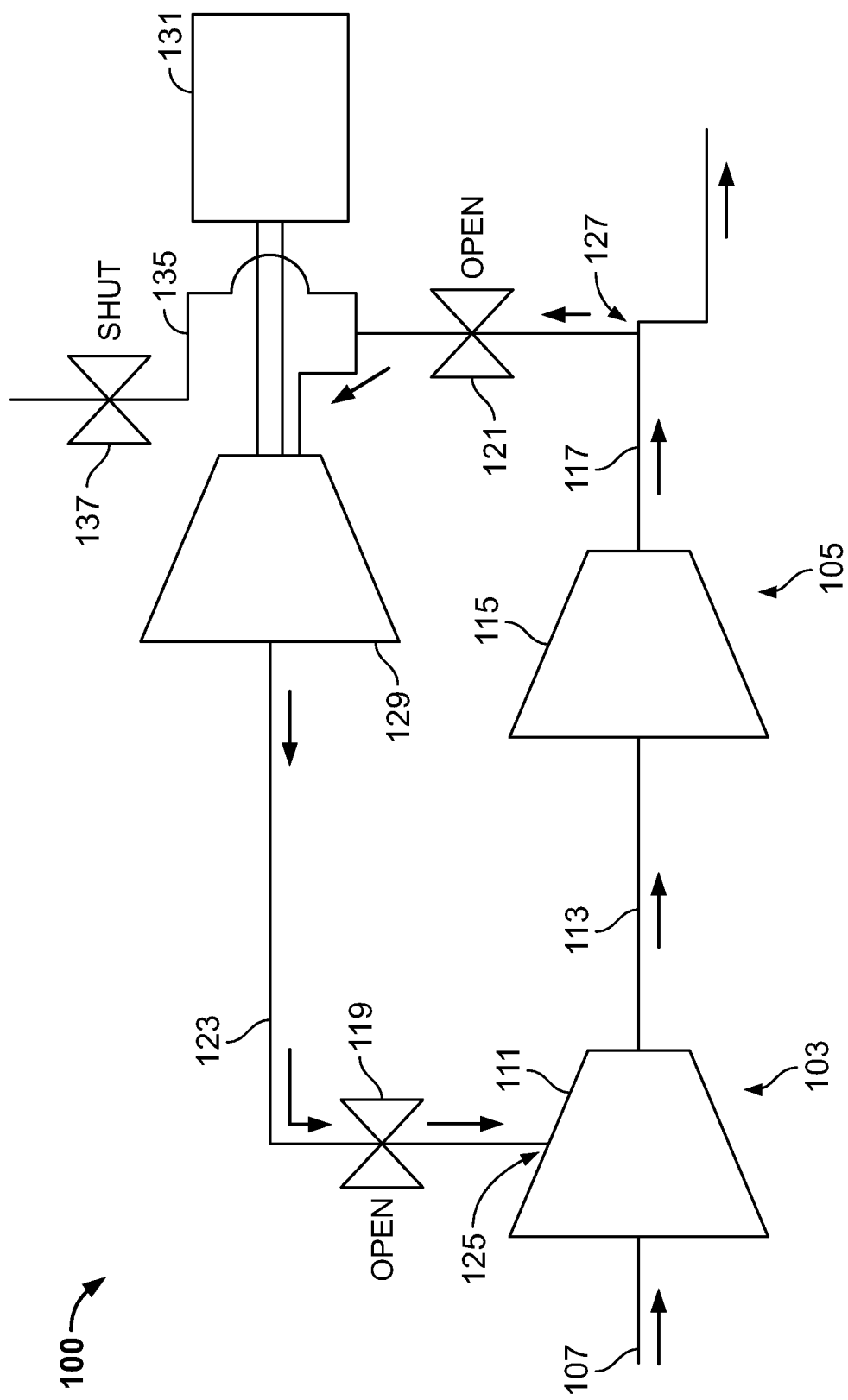
FIG. 4 is a schematic view of the operation a system for controlling surge margin in a compressor section in accordance with some embodiments of the present disclosure.
Figure 5:
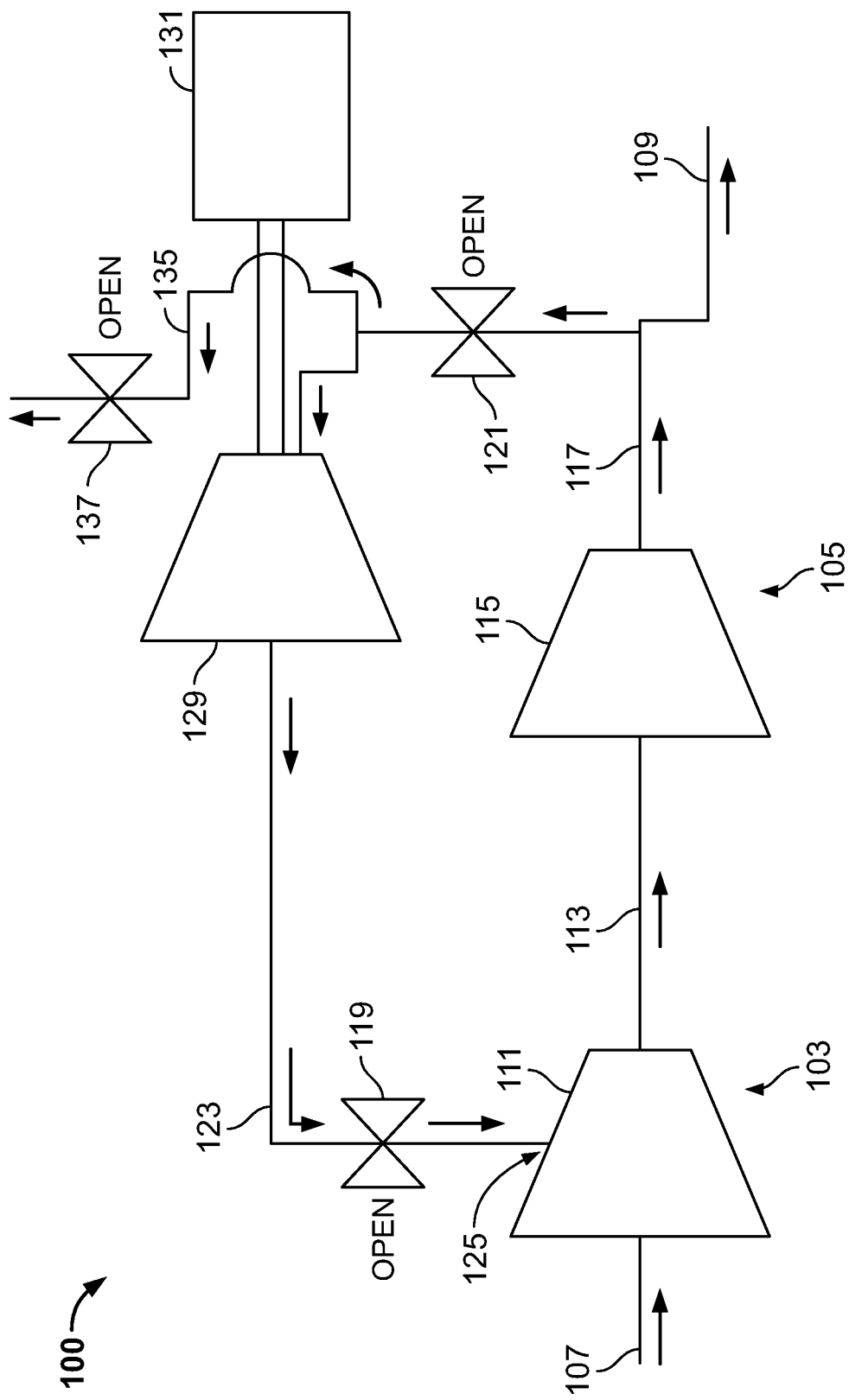
FIG. 5 is a schematic view of the operation a system for controlling surge margin in a compressor section in accordance with some embodiments of the present disclosure.

FIGS. 3, 4, and 5 of the present disclosure illustrate various operating configurations of the disclosed system 100. During operation, the bypass section 102 may be offline, with the first compressor section bypass control valve 119 and the second compressor section bypass control valve 121 shut. However, in order to control and/or improve surge margin of the compressor section 101, including of one or both of the first compressor section 103 and the second compressor section 105, the first compressor section bypass control valve 119, the second compressor section bypass control valve 121, and discharge control valve 137 may be operated to control flow through the bypass section 102. Fluid flow in FIGS. 3, 4, and 4 is illustrated with arrows.

In the configuration shown in FIG. 3, the system 100 is configured to bleed air from the first compressor section 103. This configuration may be particularly advantageous when used during low speed operations of the compressor section 101 and/or gas turbine engine, and may be referred to as a boosted low speed operation. In standard low speed and/or low flow operating conditions for the compressor section 101, a bleed port may provide for bleeding a portion of fluid flow to atmosphere. However, due to the low flow condition, there is relatively little bleed flow and thus the influence on surge margin is minimal. By contrast, in the configuration of FIG. 3 the auxiliary turbine 129 may serve as an ejector for the first compressor section 103, thus increasing bleed flow and improving the surge margin for the first compressor section 103, the compressor section 101, and/or the gas turbine engine. The auxiliary turbine 129 may be driven in the configuration shown in FIG. 3 by the motor-generator 131 such that the auxiliary turbine 129 is operating in a pump/compressor mode to increase bleed flow from the first compressor section 103.

As shown in FIG. 3, in some embodiments the system 100 may be operated with the first compressor section bypass control valve 119 in an open or throttled open position, the second compressor section bypass control valve 121 in a shut position, and the discharge control valve 137 in an open or throttled open position. The controller 239 may adjust the position of the first compressor section bypass control valve 119 and/or the discharge control valve 137 to adjust the flow rate of fluid through the bypass section 102.

In this configuration, fluid is admitted to the first compressor section 103 via the compressor section inlet 107. The first compressor stages 111 increase the pressure of the fluid and discharge the fluid to the second compressor section 105. A portion of the fluid is bled through the first compressor section bypass port 125 and enters the bypass conduit 123. This diverted or bled fluid operates the auxiliary turbine 129, which in turn runs the motor-generator 131 via the shaft 133. The diverted fluid exits the auxiliary turbine 129 and is discharged via the discharge conduit 135. Throttling of the first compressor section bypass control valve 119 and/or the discharge control valve 137 may adjust the rotational speed of the auxiliary turbine and/or the power output of the motor-generator 131. With the second compressor section bypass control valve 121 in the shut position, no fluid flows through the second compressor section bypass port 127.

In the configuration shown in FIG. 4, the system 100 may be configured to divert a portion of fluid from the second compressor section 105. This configuration may be referred to as recovered recirculation. While a typical recirculation in a compressor section of a gas turbine engine bleeds air at a downstream location and injects it at an upstream location of the compressor section, the configuration disclosed in FIG. 4 improves upon the thermodynamic efficiency of typical recirculation by using the bleed fluid to power an auxiliary turbine 129 and potentially the motor-generator 131.

The system 100 may be operated with the first compressor section bypass control valve 119 in an open or throttled open position, the second compressor section bypass control valve 121 in an open or throttled position, and the discharge control valve 137 in a shut position. The controller 239 may adjust the position of the first compressor section bypass control valve 119 and/or second compressor section bypass control valve 121 to adjust the flow rate of fluid through the bypass section 102.

In this configuration, fluid is diverted from the second compressor section flowpath 114 via the second compressor section bypass port 127 and enters bypass conduit 123. The second compressor section bypass control valve 121 is opened or throttled to control the flow rate of fluid diverted from the second compressor section 105. The diverted or bled fluid operates the auxiliary turbine 129, which in turn runs the motor-generator 131 via the shaft 133. The diverted fluid exits the auxiliary turbine 129 and is directed or injected into the first compressor section 103 via the first compressor section bypass port 125. Throttling of the first compressor section bypass control valve 119 and/or the second compressor section bypass control valve 121 may adjust the rotational speed of the auxiliary turbine 129 and/or the power output of the motor-generator 131. With the discharge control valve 137 in the shut position, fluid is not discharged from the system 100.

In the configuration of FIG. 4, the temperature of fluid directed into the first compressor section flowpath 112 may be controlled and/or modulated by controlling the rotational speed of the auxiliary turbine 129 and/or the power output of the motor-generator 131

The power output of the motor-generator 131 may be used in sub- or support systems of the gas turbine engine, may be diverted to other systems (such as aircraft systems when the gas turbine engine is powering an aircraft), and may be diverted to charge a battery or similar energy storage device.

In the configuration shown in FIG. 5, the system 100 may be configured to divert a portion of fluid from the second compressor section 105, with some of the diverted portion used to drive the auxiliary turbine 123 and some of the diverted portion discharged from the system 100. This configuration may be referred to as dynamic bleed. The system 100 may be operated with the first compressor section bypass control valve 119 in an open or throttled open position, the second compressor section bypass control valve 121 in an open or throttled position, and the discharge control valve 137 in an open or throttled position. The controller 239 may adjust the position of the first compressor section bypass control valve 119, second compressor section bypass control valve 121, and/or discharge control valve 137 to adjust the flow rate of fluid through the bypass section 102.

In this configuration, fluid flow through the bypass section 102 may be dynamically adjusted and even changed directions based on desired alterations to the surge margin of the compressor section 101 and/or the first compressor section 103 and second compressor section 105. Fluid flow may be diverted from the second compressor section 105, with a portion of the diverted flow discharged via the discharge conduit 135 and a portion of the diverted flow directed to the first compressor section 103 and used to operate the auxiliary turbine 129. While a relatively large fraction of air may be bled from through the second compressor section bypass control valve 121, some portion of the bled air may be used both to drive the auxiliary turbine 123 and to favorably change the aerodynamic matching between the compressor sections 103, 105. Fluid flow may be dynamically controlled and adjusted by the controller 239 and the positioning of one or more of control valves 119, 121, and 137.

In some embodiments, not limited to the configuration shown in FIG. 5, the discharge conduit 135 may intersect the bypass section 102 between the first compressor section bypass control valve 119 and the auxiliary turbine 123. In the configuration shown in FIG. 5, positioning the discharge conduit 135 between the first compressor section bypass control valve 119 and the auxiliary turbine 123 may allow for driving the auxiliary turbine 123 with a higher differential pressure than the placement of the discharge conduit 135 shown in FIG. 5.

The present disclosure additionally provides methods of controlling surge margin in a compressor section 101 of a gas turbine engine. Examples of such methods are presented in the flow diagrams of FIGS. 6, 7, and 8.

Figure 6:
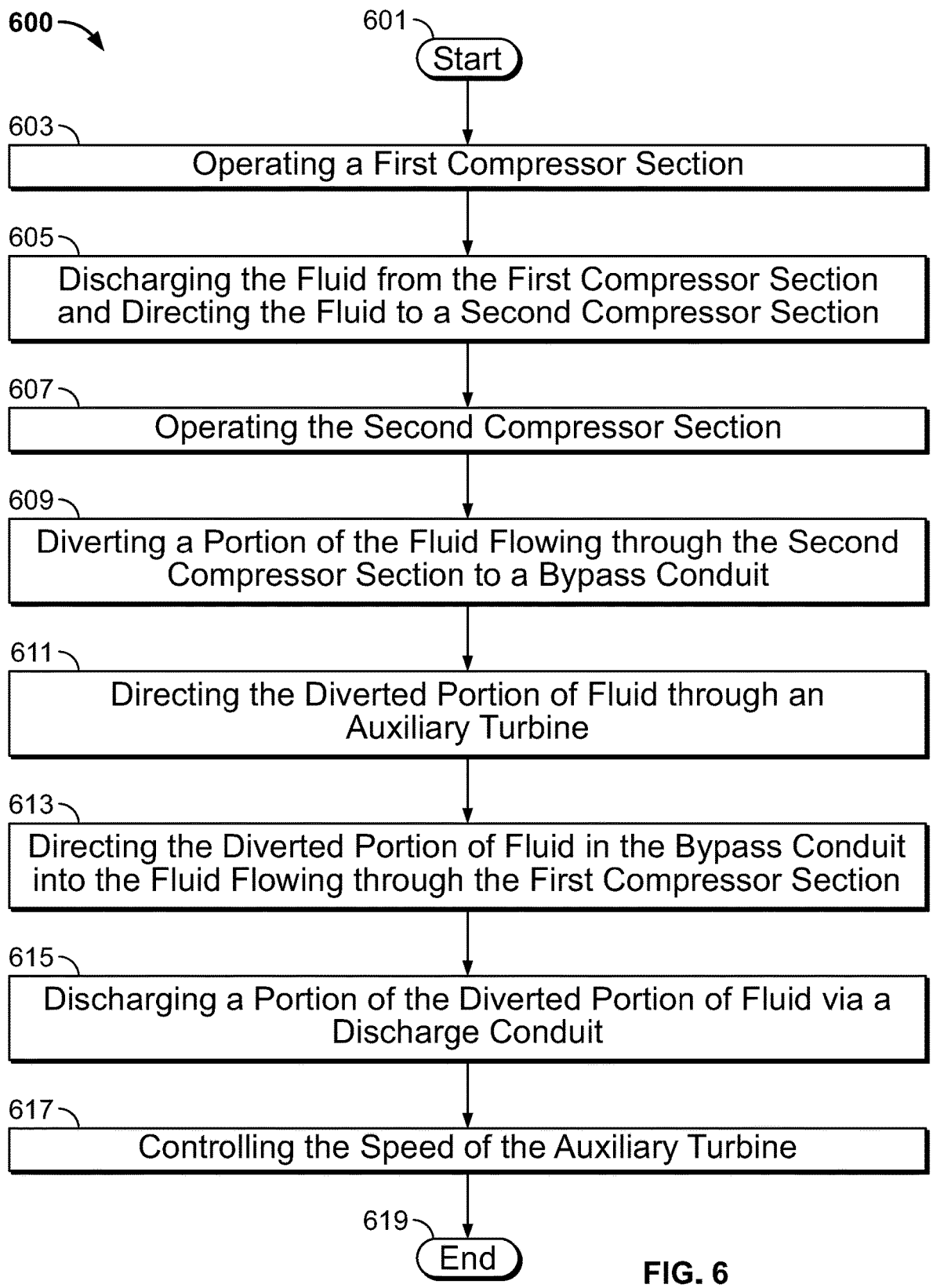
FIG. 6 is a flow diagram of a method of controlling surge margin in a compressor section in accordance with some embodiments of the present disclosure.

A method 600 of controlling surge margin in a compressor section 101 of a gas turbine engine is presented in the flow diagram of FIG. 6. Method 600 starts at Block 601. The steps of method 600, presented at Blocks 601 through 619, may be performed in the order presented in FIG. 6 or in another order. One or more steps of the method 600 may not be performed. Method 600 may be referred to as recovered recirculation and may in some embodiments correspond with the system 100 configuration presented at FIG. 4.

At Block 603 a first compressor section 103 may be operated to increase the pressure of a fluid flowing through the first compressor section flowpath 112. The fluid may be discharged from the first compressor section 103 at Block 605 and directed to a second compressor section 105. At Block 607 the second compressor section 105 may be operated to increase the pressure of the fluid flowing through the second compressor section flowpath 114.

At Block 609 a portion of the fluid flowing through the second compressor section flowpath 114 may be diverted to the bypass conduit 123 via the second compressor section bypass port 127. This step may comprise opening a second compressor section bypass control valve 121 positioned in the bypass conduit 123, and may further comprise throttling the second compressor section bypass control valve 121 to control the flow rate of fluid diverted from the second compressor section 105.

At Block 611 the diverted fluid may be directed through an auxiliary turbine 129 positioned in the bypass conduit 123.

At Block 613 the diverted fluid may be directed into the fluid flowing through the first compressor section 103 via the first compressor section bypass port 125. This step may comprise opening a first compressor section bypass control valve 119 positioned in the bypass conduit 123, and may further comprise throttling the first compressor section bypass control valve 119 to control the flow rate of fluid directed into the first compressor section 103.

At Block 615 a portion of the diverted portion of fluid may be discharged via a discharge conduit 135. The discharge may be initiated and controlled by opening or throttling open a discharge control valve 137 in the discharge conduit 135.

At Block 617 the rotational speed of the auxiliary turbine 129 may be controlled. This step may be accomplished in a number of ways. For example, the rotational speed of the auxiliary turbine 129 may be at least partly controlled by throttling one or more of the second compressor section bypass control valve 121, the first compressor section bypass control valve 119, and/or the discharge control valve 137.

Method 600 ends at Block 619.

Figure 7:
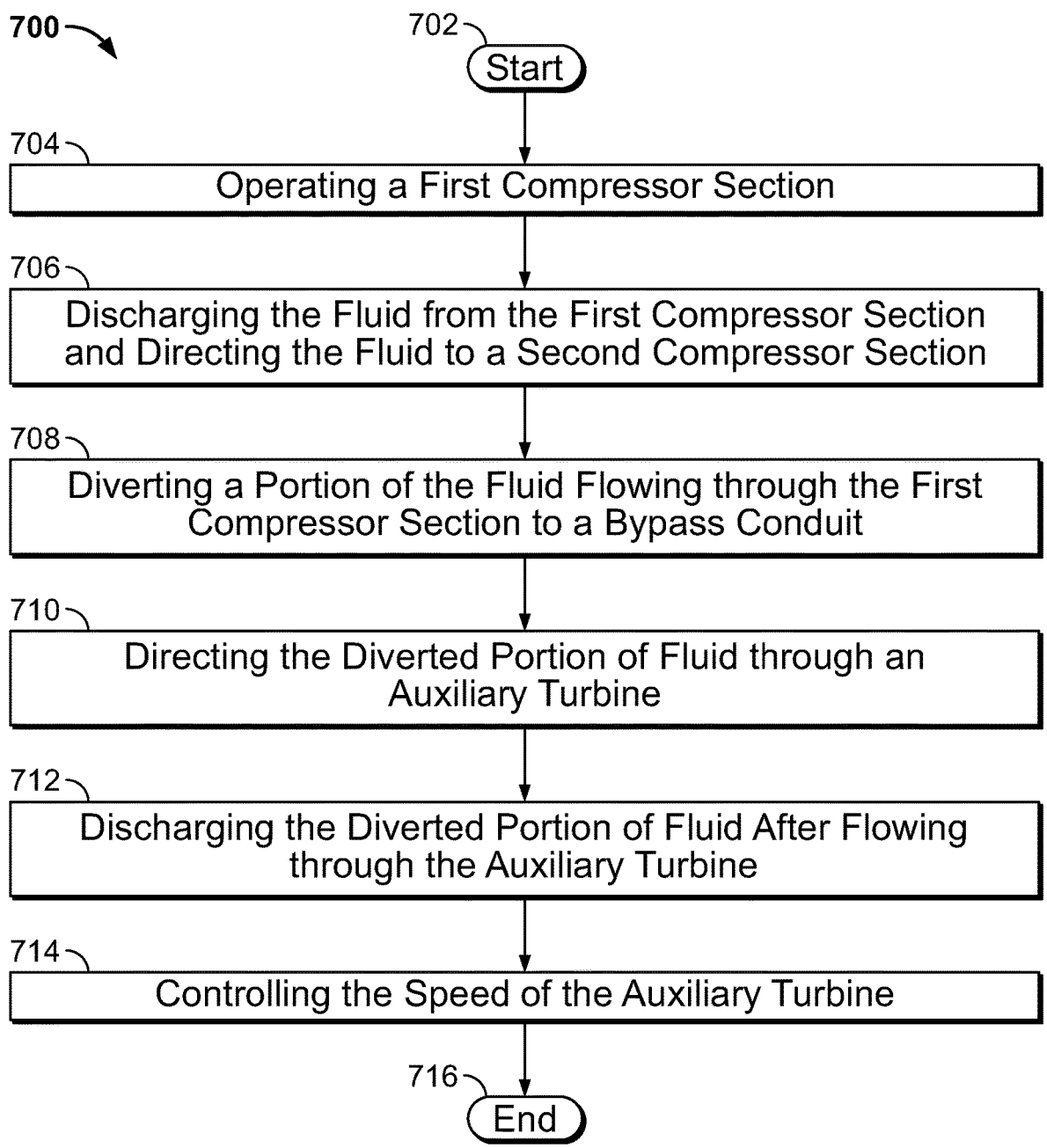
FIG. 7 is a flow diagram of a method of controlling surge margin in a compressor section in accordance with some embodiments of the present disclosure.

A method 700 of controlling surge margin in a compressor section 101 of a gas turbine engine is presented in the flow diagram of FIG. 7. Method 700 starts at Block 702. The steps of method 700, presented at Blocks 702 through 716, may be performed in the order presented in FIG. 7 or in another order. One or more steps of the method 700 may not be performed. Method 700 may be referred to as boosted low speed operations and may in some embodiments correspond with the system 100 configuration presented at FIG. 3.

At Block 704, a first compressor section 103 is operated to increase the pressure of a fluid flowing through the first compressor section flowpath 112. The fluid is discharged from the first compressor section 103 at Block 706 and directed to a second compressor section 105.

At Block 708 a portion of the fluid flowing through the first compressor section 103 is diverted via a first compressor section bypass port 125 to a bypass conduit 123. The fluid may be diverted by opening or throttling open a first compressor section bypass control valve 119 positioned in the bypass conduit 123.

The diverted portion of fluid may be directed through an auxiliary turbine 129 positioned in the bypass conduit 123 at Block 710. Depending on the instantaneous needs of the thermodynamic cycle and the running conditions of either or both of first compressor section 103 and second compressor section 105, the auxiliary turbine 123 may be used to either absorb power from flow through the bypass section 102 (i.e. operated in turbine mode) or perform positive work on the flow through the bypass section 102 in order to draw bleed flow from the first compressor section 103 (i.e. operated in a pump/compressor/ejector mode).

At Block 712, the diverted portion of fluid may be discharged after flowing through the auxiliary turbine 129 via a discharge conduit 135.

At Block 714 the rotational speed of the auxiliary turbine 129 may be controlled, for example by throttling one or both of the first compressor section bypass control valve 119 and the discharge control valve 137.

Method 700 ends at Block 716.

Figure 8:
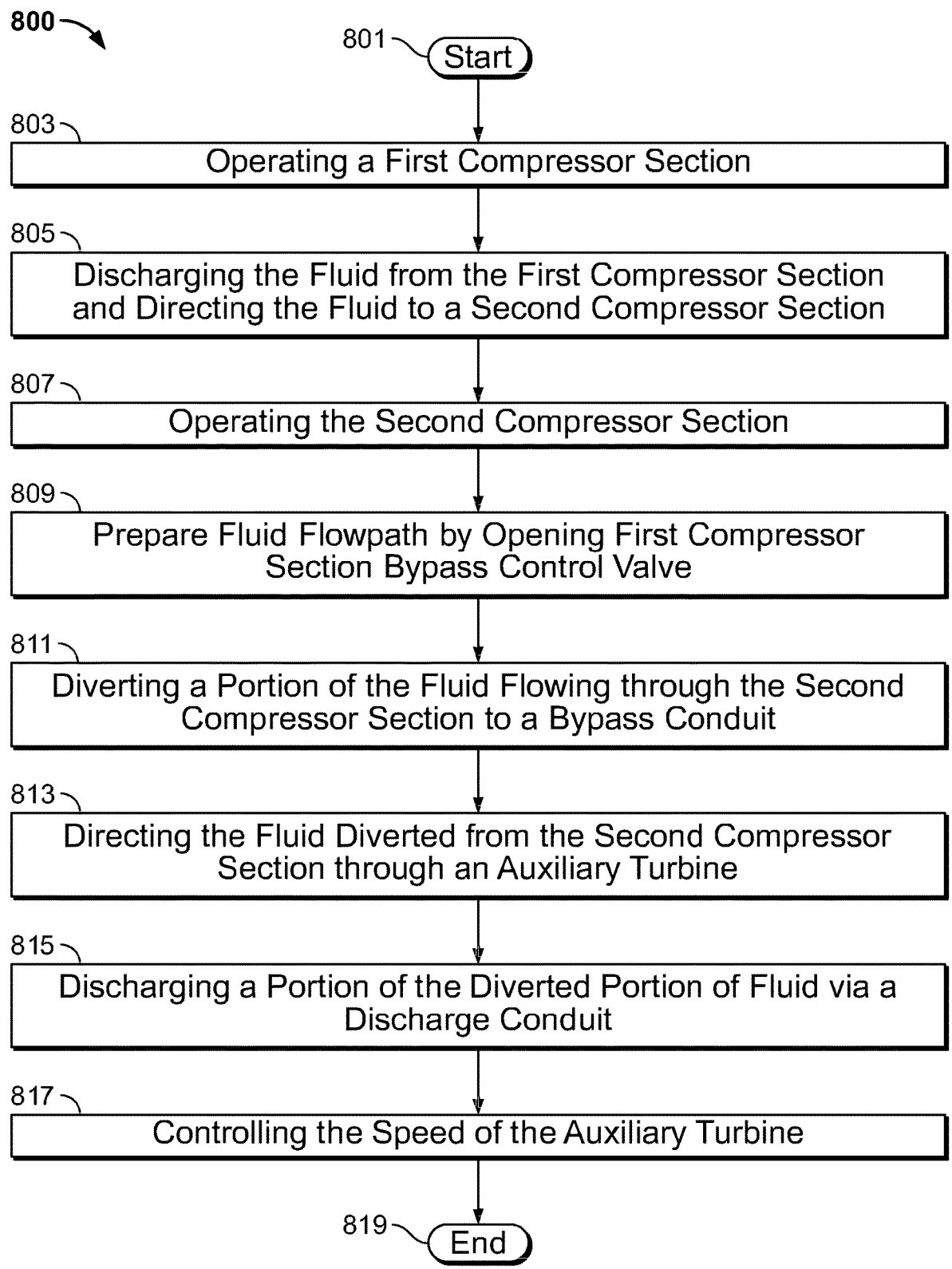
FIG. 8 is a flow diagram of a method of controlling surge margin in a compressor section in accordance with some embodiments of the present disclosure.

A method 800 of controlling surge margin in a compressor section 101 of a gas turbine engine is presented in the flow diagram of FIG. 8. Method 800 starts at Block 801. The steps of method 800, presented at Blocks 801 through 819, may be performed in the order presented in FIG. 8 or in another order. One or more steps of the method 800 may not be performed. Method 800 may be referred to as dynamic bleed and may in some embodiments correspond with the system 100 configuration presented at FIG. 5.

At Block 803 a first compressor section 103 may be operated to increase the pressure of a fluid flowing through the first compressor section flowpath 112. The fluid may be discharged from the first compressor section 103 at Block 805 and directed to a second compressor section 105. At Block 807 the second compressor section 105 may be operated to increase the pressure of the fluid flowing through the second compressor section flowpath 114.

At Block 809 a fluid flowpath may be formed for receiving bleed air from the second compressor section. This step may comprise opening a first compressor section bypass control valve 119 positioned in the bypass conduit 123, and may further comprise throttling the first compressor section bypass control valve 119 to control the flow rate of fluid diverted from the first compressor section 103.

At Block 811 a portion of the fluid flowing through the second compressor section flowpath 114 may be diverted to the bypass conduit 123 via the second compressor section bypass port 127. This step may comprise opening a second compressor section bypass control valve 121 positioned in the bypass conduit 123, and may further comprise throttling the second compressor section bypass control valve 121 to control the flow rate of fluid diverted from the second compressor section 105.

At Block 813 the fluid diverted from the second compressor section 105 may be directed through an auxiliary turbine 129 positioned in the bypass conduit 123.

At Block 815 all or a portion of the fluid diverted from the second compressor section 105 may be discharged via a discharge conduit 135. This step may comprise opening and/or throttling open a discharge control valve 137.

At Block 817 the rotational speed of the auxiliary turbine 129 may be controlled. This step may be accomplished in a number of ways. For example, the rotational speed of the auxiliary turbine 129 may be at least partly controlled by throttling one or more of the second compressor section bypass control valve 121, the first compressor section bypass control valve 119, and/or the discharge control valve 137.

Method 800 ends at Block 819.

The present disclosure provides numerous advantages over prior art compressor bleed systems. The diverting or bleeding of fluid from the compressor section may be used to maintain or improve the surge margin of the compressor section. The use of the diverted fluid to operate an auxiliary turbine and motor-generator reduces the efficiency losses of the system by recovering work from the fluid pressurized in the compressor section. The disclosed bypass section also allows for dynamically controlling surge margin of the compressor section by adjusting the position of control valves to adjust and control fluid flow through the bypass section.

By increasing the ability and precision by which surge margin is controlled, the presently disclosed systems and methods also allow reducing the minimum surge margin at which a compressor section is controlled or operated. For example, in certain gas turbine engines it may be common to establish a minimum surge margin of 15%. With the greater control, flexibility, and precision afforded by the present disclosure, that minimum surge margin may be reduced to, for example, 10% of even 8%. Such a reduction allows for a greater operating range of the compressor section while maintaining confidence that the compressor section will avoid a surge condition.

Additional advantages of the disclosed systems and methods may include that the use of the auxiliary turbine as an ejector may allow for a reduction in the size and weight of the handling bleed apparatus. The operating line of the compressor and/or first compressor section and second compressor section may be modulated directly without incurring severe thermodynamic losses or locating variable geometry in the hottest section of the engine. The compressor may be designed at higher efficiency, owing to fewer compromises made in the name of maintaining adequate stability margin. Also, based on the presently disclosed systems and methods the inter-stage matching of the compressor can be modulated.

Still further, the auxiliary turbine and motor-generator may be used to power other systems on the platform (such as an aircraft) without a coaxial (and likely heavier) motor-generator. The reinjected fluid can be used to re-energize low-momentum fluid in the flowpath, thereby improving local aerodynamic performance and stability margin. Finally, handling bleed can be drawn from the compressor section without dumping to atmosphere and generating high-intensity noise Although examples are illustrated and described herein, embodiments are nevertheless not limited to the details shown, since various modifications and structural changes may be made therein by those of ordinary skill within the scope and range of equivalents of the claims.

What is claimed is:

1. A method of controlling surge margin in a compressor section of a gas turbine engine, said method comprising:
   operating a first compressor section to increase a pressure of a fluid flowing therethrough, the first compressor section comprising one or more first compressor stages defining a first compressor section flowpath, a first compressor section discharge in fluid communication with the first compressor section flowpath, and a first compressor section bypass port positioned along the first compressor section and in fluid communication with the first compressor section flowpath;
   discharging at least a first portion of the fluid from the first compressor section and directing the first portion of the fluid to a second compressor section, the second compressor section comprising one or more second compressor stages defining a second compressor section flowpath in fluid communication with the first compressor section discharge, a second compressor section discharge in fluid communication with the second compressor section flowpath, and a second compressor section bypass port positioned along the second compressor section and in fluid communication with the second compressor section flowpath;
   operating the second compressor section to increase a pressure of the fluid flowing therethrough;
   opening a first compressor section bypass control valve, in fluid communication with the first compressor section bypass port, and opening a second compressor section bypass control valve, in fluid communication with the second compressor section bypass port, diverting a second portion of the fluid flowing through the second compressor section via the second compressor section bypass port and via the second compressor section bypass control valve to a bypass conduit, directing the diverted second portion of the fluid through an auxiliary turbine positioned in the bypass conduit and directing the diverted second portion of the fluid in the bypass conduit into the fluid flowing through the first compressor section via the first compressor section bypass control valve and via the first compressor section bypass port; and
   closing the second compressor section bypass control valve, diverting, a third portion of the fluid flowing through the first compressor section via the first compressor section bypass port and via the first compressor section bypass control valve to the bypass conduit and directing the diverted third portion of the fluid through the auxiliary turbine positioned in the bypass conduit.

2. The method of claim 1 further comprising: when the second compressor section bypass control valve is open, discharging a portion of the diverted second portion of the fluid via a discharge conduit; and when the second compressor section bypass control valve is closed, discharging a portion of the diverted third portion of the fluid via the discharge conduit.

3. The method of claim 1 wherein the step of diverting the second portion of the fluid flowing through the second compressor section via the second compressor section bypass port further comprises throttling said second compressor section bypass control valve to control the flow rate of the diverted second portion of the fluid.

4. The method of claim 1 wherein the step of directing the diverted second portion of the fluid in the bypass conduit into the fluid flowing through the first compressor section further comprises throttling said first compressor section bypass control valve to control a flow rate of the diverted second portion of the fluid.

5. The method of claim 1 wherein a rotational speed of the auxiliary turbine is at least partly controlled by throttling said second compressor section bypass control valve.

6. The method of claim 1 wherein a rotational speed of the auxiliary turbine is at least partly controlled by throttling said first compressor section bypass control valve.

7. The method of claim 2 wherein the step of discharging the portion of the diverted second portion of the fluid via the discharge conduit or the step of discharging the portion of the diverted third portion of the fluid via the discharge conduit comprises opening a discharge control valve positioned in the discharge conduit.

8. The method of claim 7 wherein a rotational speed of the auxiliary turbine is at least partly controlled by throttling said discharge control valve.

9. The method of claim 2, wherein the discharge conduit is located between the second compressor section bypass port and the auxiliary turbine along the bypass conduit.

10. The method of claim 1, wherein a motor-generator drives the auxiliary turbine in the second operating condition in a pump/compressor mode to increase bleed flow from the first compressor section.

11. The method of claim 1, wherein, when the second compressor section bypass control valve is closed, the first and second compressor sections operate at a first rotational speed, wherein, when the second compressor section bypass control valve is open, the first and second compressor sections operate at a second rotational speed, and wherein the first rotational speed is lower than the second rotational speed.

12. A method of controlling surge margin in a compressor section of a gas turbine engine, said method comprising:
   operating a first compressor section to increase a pressure of a fluid flowing therethrough, the first compressor section comprising one or more first compressor stages defining a first compressor section flowpath, a first compressor section discharge in fluid communication with the first compressor section flowpath, and a first compressor section bypass port positioned along the first compressor section and in fluid communication with the first compressor section flowpath;
   discharging the fluid from the first compressor section and directing the fluid to a second compressor section having a second compressor section bypass port positioned along the second compressor section wherein the second compressor bypass port is in fluid communication with a second compressor section flowpath;
   opening a first compressor section bypass control valve in fluid communication with the first compressor section bypass port;
   closing a second compressor section bypass control valve in fluid communication with the second compressor section bypass port;
   diverting a first portion of the fluid flowing through the first compressor section via the first compressor section bypass port and via the first compressor section bypass valve to a bypass conduit; and
   directing the diverted first portion of the fluid through an auxiliary turbine positioned in the bypass conduit wherein the first compressor section bypass control valve is positioned in the bypass conduit between the first compressor section bypass port and the auxiliary turbine and wherein the second compressor section bypass control valve is positioned in the bypass conduit between the auxiliary turbine and the second compressor section bypass control port;
   opening the second compressor section bypass control valve;
   opening a discharge control valve in fluid communication with the second compressor section bypass control valve and the auxiliary turbine; and
   diverting a second portion of the fluid flowing through the second compressor section via the second compressor section bypass port and via the second compressor section bypass control valve to the bypass conduit, directing a first portion of the diverted second portion of the fluid through the auxiliary turbine positioned in the bypass conduit and directing a second portion of the diverted second portion of the fluid through the discharge control valve.

13. The method of claim 12 further comprising: when the second compressor section bypass control valve is closed, discharging the diverted first portion of the fluid after flowing through the auxiliary turbine via a discharge conduit and via the discharge control valve.

14. The method of claim 12 wherein a rotational speed of the auxiliary turbine is at least partly controlled by throttling said first compressor section bypass control valve.

* * * * *